United States Patent
Chang et al.

(10) Patent No.: US 9,786,911 B2
(45) Date of Patent: *Oct. 10, 2017

(54) CATHODE ACTIVE MATERIAL AND LITHIUM SECONDARY BATTERY COMPRISING THE SAME

(75) Inventors: Sung-Kyun Chang, Daejeon (KR); Hong Kyu Park, Daejeon (KR); Sin Young Park, Daejeon (KR); Jin-hyung Lim, Daejeon (KR); DongHun Lee, Seoul (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,430

(22) Filed: Jun. 21, 2012

(65) Prior Publication Data

US 2013/0122363 A1 May 16, 2013

Related U.S. Application Data

(63) Continuation of application No. PCT/KR2011/003066, filed on Apr. 27, 2011.

(30) Foreign Application Priority Data

Apr. 30, 2010 (KR) .................. 10-2010-0041015

(51) Int. Cl.
| | |
|---|---|
| *H01M 4/485* | (2010.01) |
| *H01M 4/36* | (2006.01) |
| *H01M 4/48* | (2010.01) |
| *H01M 4/505* | (2010.01) |
| *H01M 4/525* | (2010.01) |
| *H01M 4/58* | (2010.01) |
| *H01M 10/052* | (2010.01) |
| *H01M 10/0525* | (2010.01) |
| *C01G 53/04* | (2006.01) |
| *C01G 53/00* | (2006.01) |

(52) U.S. Cl.
CPC ........... *H01M 4/485* (2013.01); *C01G 53/50* (2013.01); *H01M 4/364* (2013.01); *H01M 4/48* (2013.01); *H01M 4/505* (2013.01); *H01M 4/525* (2013.01); *H01M 4/5825* (2013.01); *H01M 10/052* (2013.01); *H01M 10/0525* (2013.01); *H01M 2220/20* (2013.01); *Y02E 60/122* (2013.01); *Y02T 10/7011* (2013.01)

(58) Field of Classification Search
CPC ........ H01M 4/485; H01M 4/364; H01M 4/48; H01M 4/505; H01M 4/525; H01M 4/5825; H01M 10/052; H01M 10/0525; H01M 2220/20; Y02E 60/122; Y02T 10/7011; C01G 53/50; C01P 2002/20; C01P 2004/80; C01P 2006/40
USPC ................ 429/211; 252/182.1, 519.15
See application file for complete search history.

(56) References Cited

U.S. PATENT DOCUMENTS

| | | | |
|---|---|---|---|
| 6,660,432 B2 | 12/2003 | Paulsen et al. | |
| 8,394,299 B2* | 3/2013 | Shin et al. | ............... 252/521.2 |
| 2001/0024754 A1 | 9/2001 | Fukuzawa et al. | |
| 2003/0022063 A1* | 1/2003 | Paulsen et al. | ............ 429/231.3 |
| 2003/0180616 A1 | 9/2003 | Johnson et al. | |
| 2005/0069771 A1* | 3/2005 | Manev et al. | ................ 429/223 |
| 2006/0134520 A1* | 6/2006 | Ishii et al. | .................... 429/223 |
| 2006/0233696 A1 | 10/2006 | Paulsen et al. | |
| 2007/0202407 A1* | 8/2007 | Eberman et al. | ........... 429/231.3 |
| 2007/0292761 A1 | 12/2007 | Park et al. | |
| 2008/0160410 A1 | 7/2008 | Sun et al. | |
| 2008/0280205 A1 | 11/2008 | Jiang et al. | |
| 2009/0226810 A1* | 9/2009 | Paulsen et al. | ............... 429/223 |
| 2010/0148115 A1 | 6/2010 | Chang et al. | |
| 2012/0097905 A1 | 4/2012 | Chang et al. | |
| 2012/0112139 A1 | 5/2012 | Chang et al. | |
| 2013/0065118 A1 | 3/2013 | Chang et al. | |

FOREIGN PATENT DOCUMENTS

| | | |
|---|---|---|
| CN | 101682074 A | 3/2010 |
| CN | 102668178 A | 9/2012 |
| CN | 102668179 A | 9/2012 |
| CN | 102668186 A | 9/2012 |
| CN | 102714314 A | 10/2012 |
| EP | 2506342 A2 | 10/2012 |
| EP | 2506343 A2 | 10/2012 |
| EP | 2511972 A2 | 10/2012 |
| JP | 11233113 A * | 8/1999 |
| JP | 2001250549 A | 9/2001 |
| JP | 2002128526 A | 5/2002 |
| JP | 2004281253 A * | 10/2004 |

(Continued)

OTHER PUBLICATIONS

K-PION Machine Translation of JP 10-2009-0105868A (Oct. 2009).*

(Continued)

*Primary Examiner* — Gregg Cantelmo
(74) *Attorney, Agent, or Firm* — Lerner, David, Littenberg, Krumholz & Mentlik, LLP

(57) ABSTRACT

Disclosed is a cathode active material for secondary batteries comprising at least one compound selected from the following formula 1:

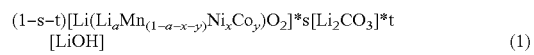

$$(1-s-t)[Li(Li_a Mn_{(1-a-x-y)}Ni_x Co_y)O_2]*s[Li_2CO_3]*t[LiOH] \quad (1)$$

wherein $0<a<0.2$, $0<x<0.9$, $0<y<0.5$, $a+x+y<1$, $0<s<0.03$, and $0<t<0.03$; and a, x and y represent a molar ratio, and a and t represent a weight ratio. The cathode active material has long lifespan at room temperature and high temperatures and provides superior stability, although charge and discharge are repeated at a high current.

9 Claims, No Drawings

(56) References Cited

FOREIGN PATENT DOCUMENTS

| | | |
|---|---|---|
| JP | 2005-327644 A | 11/2005 |
| JP | 2008147068 A | 6/2008 |
| KR | 10-2006-0035547 A | 4/2006 |
| KR | 20070109854 A | 11/2007 |
| KR | 20070109878 A | 11/2007 |
| KR | 10-2007-0118933 A | 12/2007 |
| KR | 10-2008-0029479 A | 4/2008 |
| KR | 10-2009-0105868 A | 10/2009 |
| KR | 20090127589 A | 12/2009 |

OTHER PUBLICATIONS

IPDL Machine Translation of JP 11-233113A (Aug. 1999).*
European Search Report issued in European Application No. 11825434.1 on Oct. 11, 2016.
Chinese Office Action issued in Chinese Patent Application No. 201180043709.4 on May 21, 2015.
Extended European Search Report for Application No. EP11825434 dated Dec. 22, 2016.

* cited by examiner

CATHODE ACTIVE MATERIAL AND LITHIUM SECONDARY BATTERY COMPRISING THE SAME

CROSS REFERENCE TO RELATED APPLICATIONS

This application is a Bypass Continuation of PCT International Application No. PCT/KR2011/003066 filed on Apr. 27, 2011, which claims priority under 35 U.S.C. §119(a) to patent application Ser. No. 10-2010-0041015 filed in the Republic of Korea on Apr. 30, 2010, all of which are hereby expressly incorporated by reference into the present application.

TECHNICAL FIELD

The present invention relates to a cathode active material for secondary batteries. More specifically, the present invention relates to a cathode active material for secondary batteries having long lifespan at room temperature and high temperature and superior stability, since it comprises a compound having a specific composition.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

In addition, increased interest in environmental issues has brought about a great deal of research associated with electric vehicles (EVs) and hybrid electric vehicles (HEVs) as substitutes for vehicles using fossil fuels such as gasoline vehicles and diesel vehicles which are main factors of air pollution. These electric vehicles generally use nickel metal hydride (Ni-MH) secondary batteries as power sources of electric vehicles (EVs), hybrid electric vehicles (HEVs) and the like. However, a great deal of study associated with use of lithium secondary batteries with high energy density and discharge voltage is currently underway and some are commercially available.

In particular, lithium secondary batteries used for electric vehicles should have high energy density, exhibit great power within a short time and be used for 10 years or longer under harsh conditions in which charge and discharge based on high current is repeated within a short time, thus requiring considerably superior stability and long lifespan, as compared to conventional small lithium secondary batteries.

As the cathode active material of lithium ion secondary batteries used for small batteries, lithium-containing cobalt oxide such as $LiCoO_2$ having a layered structure is used. In addition, use of lithium-containing manganese oxides such as $LiMnO_2$ having a layered crystal structure and $LiMn_2O_4$ having a spinel crystal structure, and lithium-containing nickel oxide ($LiNiO_2$) has been considered.

Among these cathode active materials, $LiCoO_2$ is the most generally used owing to lifespan properties and high charge and discharge efficiency, but has disadvantages of low structural stability and cost due to resource limitations of cobalt used as a raw material and thus limitation of price competitiveness.

Lithium manganese oxides such as $LiMnO_2$ and $LiMn_2O_4$ have advantages of superior thermal stability and low cost, but having disadvantages of small capacity and low high-temperature properties.

In addition, $LiNiO_2$ cathode active materials exhibit better properties of superior charge capacity, but are considerably difficult to synthesize due to the problem of cation mixing between Li and transition metal, thus having great problems associated with rate characteristics.

DISCLOSURE

Technical Problem

Therefore, the present invention has been made to solve the above and other technical problems that have yet to be resolved.

As a result of a variety of extensive and intensive studies and experiments to solve the problems as described above, the inventors of the present invention have developed a cathode active material for secondary batteries comprising a compound of Formula 1 and discovered that, when a secondary battery is fabricated using the cathode active material, the active material contributes to improvement in battery stability and can improve performance such as lifespan characteristics. Based on this discovery, the present invention has been completed.

Technical Solution

In accordance with one aspect of the present invention, provided is a cathode active material for secondary batteries, comprising at least one compound selected from the following formula 1:

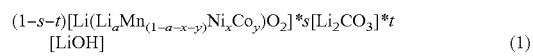

$$(1-s-t)[Li(Li_aMn_{(1-a-x-y)}Ni_xCo_y)O_2]*s[Li_2CO_3]*t[LiOH] \quad (1)$$

wherein $0<a<0.2$, $0<x<0.9$, $0<y<0.5$, $a+x+y<1$; $0<s<0.03$, and $0<t<0.03$; and a, x and y represent a molar ratio, and a and t represent a weight ratio.

As can be seen above, the present invention uses lithium nickel manganese cobalt composite oxide having a layered structure, and a specific element and compound composition, as a cathode active material.

a in Formula 1 is higher than 0 and lower than 0.2 as defined above, and is preferably 0.01 to 0.19. x in Formula 1 is higher than 0 and lower than 0.9 as defined above, and is preferably 0.2 to 0.8.

Lithium carbonate and lithium hydroxide induce HF, strong acid that may be present in batteries to the compound of the formula and thereby inhibits negative reactions of HF, thereby contributing to improvement in stability of batteries and improving performance such as lifespan properties.

As defined above, lithium carbonate and lithium hydroxide are present in an amount lower than a weight ratio of 0.03 with respect to the total weight of the active material. When the contents of lithium carbonate and lithium hydroxide are excessively high, they may disadvantageously cause deterioration in battery capacity. The ratio of lithium carbonate to lithium hydroxide is also important and, as a result of repeated research of the present inventors, can be obtained by control of synthesis procedure, control after synthesis and the like. Such a principle is represented by the active material of formula 1, but is simply not limited to the compound.

Commonly, in the compound of Formula 1, at least one of transition metals such as Mn, Ni and Co may be substituted by other elements that may be disposed in a six-coordination structure. The substitution amount is about 10% or lower of the total amount of the transition metal.

In the compound of Formula 1, the content of oxygen (O) may be substituted within a predetermined amount by other anion. As is well-known in the art, the substituted anion is preferably at least one selected from the group consisting of halogen elements, chalcogenide elements and nitrogen.

The substitution of anions improves bonding force with transition metals and prevents structural transition of the cathode active material, thus improving lifespan of the batteries. On the other hand, when the amount of substituted anions is excessively high (higher than 0.2 molar ratio with respect to the total amount of anions), the compound of Formula 1 cannot maintain its stable structure, thus disadvantageously causing deterioration in lifespan. Accordingly, the amount of substituted anions is preferably 0.01 to 0.2 molar ratio, with respect to the total amount of anions, more preferably 0.01 to 0.1 molar ratio.

The cathode active material of the present invention comprising at least one selected from Formula 1 may be used alone or in combination with at least one compound selected from the group consisting of other lithium transition metal oxides and lithium transition metal phosphorous oxides.

The compound of Formula 1 comprising the cathode active material of the present invention can be prepared based on the composition formula thereof. For example, the compound can be prepared by baking a mixture of a lithium precursor and a mixed transition metal precursor under an atmosphere containing oxygen. Lithium carbonate, lithium hydroxide or the like is used as a lithium precursor and transition metal oxide, transition metal hydroxide or the like may be used as a mixed transition metal precursor. The mixed transition metal precursor may be mixtures of respective transition metal precursors or a precursor of all transition metals. The latter mixed precursor may be prepared by co-precipitation or the like.

In a preferred embodiment, a mixed precursor having a composition of $M(OH_{1-d})_2$ (in which $0<d<0.5$) is prepared by the method disclosed in Korean Patent Laid-open No. 2009-0105868 filed by the present applicant, and the transition metal precursor is mixed with a lithium compound, followed by baking. The content disclosed in Korean Patent Laid-open No. 2009-0105868 is incorporated herein as a reference.

A cathode mix can be prepared by adding a conductive material and a binder to the cathode active material of the present invention.

The cathode may be for example fabricated by mixing the cathode mix with a solvent such as water or NMP to prepare a slurry, and applying the slurry to a cathode current collector, followed by drying and pressing.

The cathode may be fabricated by applying a slurry comprising a mixture containing the cathode active material according to the present invention, a conductive material and a binder, to a cathode current collector, followed by drying. The mixture containing the cathode active material, a conductive material and a binder (cathode mix) may optionally contain at least one selected from the group consisting of a viscosity controller and a filler.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 0.01 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon black such as carbon black, acetylene black, Ketjen black, channel black, furnace black, lamp black and thermal black; carbon derivatives such as carbon nanotube or fullerene; conductive fibers such as carbon fiber and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 50% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The viscosity controller controls the viscosity of the electrode mix so as to facilitate mixing of the electrode mix and application thereof to the current collector and may be added in an amount of 30% by weight, based on the total weight of the electrode mix. Examples of the viscosity controller include, but are not limited to, carboxymethylcellulose, polyacrylic acid and polyvinylidene fluoride. If necessary, the solvent may also serve as a viscosity controller.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The cathode thus fabricated can be used in combination with an anode, a separator, and a lithium salt-containing non-aqueous electrolyte for fabrication of a lithium secondary battery.

For example, the anode is prepared by applying an anode mix comprising an anode active material to an anode current collector, followed by drying. The anode mix may comprise the afore-mentioned components, i.e., the conductive material, the binder and the filler, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte, solid electrolyte and inorganic solid electrolyte may be utilized.

Examples of the non-aqueous electrolyte that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS), fluoro-propylene carbonate (FPC) and the like.

The lithium secondary batteries comprising the cathode active material according to the present invention may be used as unit batteries of battery modules, which are power sources of medium and large devices requiring high-temperature stability, long cycle properties and superior rate properties.

Preferably, the medium and large device may be an electric vehicle (EV), a hybrid electric vehicle (HEV) or a plug-in hybrid electric vehicle (PHEV).

BEST MODE

Now, the present invention will be described in more detail with reference to the following examples. These examples are provided only to illustrate the present invention and should not be construed as limiting the scope and spirit of the present invention.

EXAMPLE 1

$Ni_{0.53}Mn_{0.27}CO_{0.2}(OH_{0.53})_2$ was synthesized as a transition metal precursor by co-precipitation in accordance with a method disclosed in Korean Patent Laid-open No. 2009-0105868, and then mixed with $Li_2CO_3$, and the resulting mixture was baked in a furnace at 940° C. and then cooled by incorporating air at 500 L/min, to synthesize $0.9978Li(Li_{0.02}(Ni_{0.53}Mn_{0.27}Co_{0.20})_{0.98})O_2*0.0012LiOH*0.0010Li_2CO_3$ as an active material.

The amounts of LiOH and $LiCO_3$ of the prepared active material were determined by adding 10 g of the prepared active material to 200 mL of water and measuring the amount of base used for titration with 0.1N HCl.

COMPARATIVE EXAMPLE 1

$0.9971Li(Li_{0.02}(Ni_{0.53}Mn_{0.27}Co_{0.20})_{0.98})O_2*0.0029Li_2CO_3$ was prepared as an active material in the same manner as in Example 1 except that a transition metal precursor in which a molar ratio of Ni, Mn, and Co (Ni:Mn:Co) is 53:27:20 was prepared by a general co-precipitation method known in the art and the amount of carbonate was maximized by incorporating $CO_2$ as an cooling atmosphere at 100 L/min for one hour when passed at 150° C. in a shaking oven.

EXAMPLE 2

$0.9972Li(Li_{0.02}(Ni_{0.53}Mn_{0.27}Co_{0.20})_{0.98})O_2*0.0018LiOH*0.0010Li_2CO_3$ was prepared as an active material in the same manner as in Example 1 except that the amount of OH was increased by cooling while passing an air at 300 L/min.

EXAMPLE 3

$0.9972Li(Li_{0.02}(Ni_{0.53}Mn_{0.27}Co_{0.20})_{0.98})O_2*0.0008LiOH*0.0020Li_2CO_3$ was prepared as an active material in the same manner as in Example 1 except that $CO_2$ was incorporated as an cooling atmosphere at 100 L/min for 15 minutes when passed at 150° C. in a shaking oven.

COMPARATIVE EXAMPLE 2

$Li(Li_{0.02}(Ni_{0.53}Mn_{0.27}Co_{0.20})_{0.98})O_2$ was prepared in the same manner as in Example 1 except that the active material was washed with distilled water to remove a base of the active material prepared in Example 1 and dried at 130° C. in an oven for 24 hours.

EXAMPLE 4

$Ni_{0.78}Mn_{0.12}Co_{0.10}(OH_{0.53})_2$ was synthesized as a transition metal precursor by co-precipitation in accordance with a method disclosed in Korean Patent Laid-open No. 2009-0105868, and then mixed with $Li_2CO_3$, and the resulting mixture was baked in a furnace at 890° C. and then cooled by passing oxygen ($O_2$) at 200 L/min, to synthesize $0.9952Li(Li_{0.02}(Ni_{0.78}Mn_{0.12}Co_{0.10})_{0.98})O_2*0.0026LiOH*0.0022Li_2CO_3$ as an active material.

The amounts of LiOH and $LiCO_3$ of the prepared material were determined by adding 10 g of the prepared active material to 200 mL of water and measuring the amount of base through titration with 0.1N HCl.

COMPARATIVE EXAMPLE 3

$0.9948Li(Li_{0.02}(Ni_{0.78}Mn_{0.12}Co_{0.10})_{0.98})O_2*0.0052Li_2CO_3$ was prepared as an active material in the same manner as in Example 4 except that a transition metal precursor in which a molar ratio of Ni, Mn, and Co (Ni:Mn:Co) is 78:12:10 was prepared by a general co-precipitation method in the art and the amount of carbonate was maximized by incorporating $CO_2$ as an cooling atmosphere at 100 L/min for one hour when passed at 150° C. in a shaking oven.

COMPARATIVE EXAMPLE 4

$Li(Li_{0.02}(Ni_{0.78}Mn_{0.12}Co_{0.10})_{0.98})O_2$ was prepared as an active material by treating the active material prepared in Example 4 in the same manner as in Comparative Example 2.

EXAMPLE 5

$Ni_{0.5}Mn_{0.4}Co_{0.1}(OH_{0.53})_2$ was synthesized as a transition metal precursor by co-precipitation in accordance with a method disclosed in Korean Patent Laid-open No. 2009-0105868, and then mixed with $Li_2CO_3$, and the resulting mixture was baked in a furnace at 950° C. and then cooled by passing an air at 500 L/min, to synthesize $0.9967Li(Li_{0.1}(Ni_{0.5}Mn_{0.4}Co_{0.1})_{0.9})O_2*0.0021LiOH*0.0012Li_2CO_3$ as an active material.

The amounts of LiOH and $LiCO_3$ of the prepared material were determined by adding 10 g of the prepared active material to 200 mL of water and measuring the amount of base through titration with 0.1N HCl.

COMPARATIVE EXAMPLE 5

$0.9966Li(Li_{0.1}(Ni_{0.5}Mn_{0.4}Co_{0.1}))O_2*0.0034Li_2CO_3$ was prepared as an active material in the same manner as in Example 4 except that a transition metal precursor in which a molar ratio of Ni, Mn, and Co (Ni:Mn:Co) is 5:4:1 was prepared by a general co-precipitation method in the art and the amount of carbonate was maximized by incorporating $CO_2$ as an cooling atmosphere at 100 L/min for one hour when passed at 150° C. in a shaking oven.

COMPARATIVE EXAMPLE 6

$Li(Li_{0.1}(Ni_{0.5}Mn_{0.4}Co_{0.1}))O_2$ was prepared as an active material by treating the active material prepared in Example 5 in the same manner as in Comparative Example 2.

TEST EXAMPLE 1

A slurry was prepared using each of the active materials synthesized in Examples 1 to 5 and Comparative Examples 1 to 6 such that an active material:conductive material: binder was 95:2.5:2.5 and then coated on an Al foil. The electrode obtained was pressed such that a pore ratio was 23% and punched in the form of a circle to fabricate a coin-type battery. At this time, a Li metal was used as an anode and a solution of 1M $LiPF_6$ in a carbonate mixed solvent (EC:DMC:DEC=1:2:1, volume ratio) was used as an electrolyte.

The batteries thus fabricated were tested under conditions described in the following Table 1.

TABLE 1

| | Electrochemical test results | | | |
|---|---|---|---|---|
| | Discharge capacity (mAh/g) | $1^{st}$ cycle efficiency (%) | Rate capability 2.0 C. · 0.1 C. (%) | Cycle capability $30^{th}$ cycle/$1^{st}$ cycle (%) |
| Ex. 1 | 163 | 88 | 85 | 95 |
| Comp. Ex. 1 | 158 | 85 | 78 | 89 |
| Ex. 2 | 164 | 89 | 86 | 94 |
| Ex. 3 | 161 | 87 | 84 | 92 |
| Comp. Ex. 2 | 165 | 89 | 85 | 82 |
| Ex. 4 | 195 | 89 | 84 | 92 |
| Comp. Ex. 3 | 189 | 86 | 79 | 87 |
| Comp. Ex. 4 | 196 | 90 | 85 | 80 |
| Ex. 5 | 159 | 91 | 87 | 97 |
| Comp. Ex. 5 | 149 | 87 | 78 | 89 |
| Comp. Ex. 6 | 160 | 91 | 86 | 85 |

As can be seen from Table 1 above, LiOH and $Li_2CO_3$ play a considerably important in the active materials. As can be seen from Comparative Examples 2, 4 and 6, when LiOH and $Li_2CO_3$ are not present in the active materials, rate characteristics and cycle characteristics are rapidly reduced. This difference in characteristics is 10 to 15-times higher than the difference shown above, when the active materials are used 300 or 500 cycles, as actual battery cycles, and in particular, the difference may further increase when applied to batteries for electric vehicles. In addition, as can be seen from the results of Comparative Examples 2, 4 and 6, performance is deteriorated although $Li_2CO_3$ is present alone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the cathode active material comprising lithium nickel-manganese-cobalt composite oxide according to the present invention can secure stability and improve lifespan properties under the conditions of high current charge within a short time and high temperature.

The invention claimed is:

1. A cathode active material for secondary batteries consisting of:
a compound of formula (1):

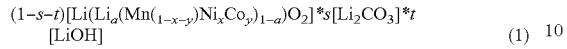

$(1-s-t)[Li(Li_a(Mn_{1-x-y})Ni_xCo_y)_{1-a})O_2]*s[Li_2CO_3]*t[LiOH]$ (1)

wherein $0<a<0.2$, $0<x<0.9$, $0<y<0.5$, $a+x+y<1$, $0.0010 \leq s<0.0022$, $0.0012 \leq t<0.0026$; $0.0022 \leq s+t<0.0048$ and a, x and y represent a molar ratio, and s and t represent a weight ratio.

2. The cathode active material according to claim 1, wherein a satisfies the condition of $0.01<a\leq0.19$.

3. The cathode active material according to claim 1, wherein x is not lower than 0.02 and is lower than 0.8.

4. The cathode active material according to claim 1, wherein y is higher than 0 and is not higher than 0.3.

5. A cathode mix for second batteries comprising the cathode active material according to claim 1.

6. A cathode for lithium secondary batteries in which the cathode mix according to claim 5 is applied to a current collector.

7. A lithium secondary battery comprising the cathode according to claim 6.

8. A middle- or large-sized battery pack comprising the secondary battery according to claim 7 as a unit battery.

9. An electric vehicle, a hybrid electric vehicle or a plug-in hybrid electric vehicle comprising the middle- or large-sized battery pack of claim 8.

* * * * *